United States Patent
Bradford et al.

(10) Patent No.: US 8,402,230 B2
(45) Date of Patent: Mar. 19, 2013

(54) RECOVERABILITY WHILE ADDING STORAGE TO A REDIRECT-ON-WRITE STORAGE POOL

(75) Inventors: David K. Bradford, Pflugerville, TX (US); David J. Craft, Wimberly, TX (US); Manoj N. Kumar, Austin, TX (US); Grover H. Neuman, Austin, TX (US); Frank L. Nichols, III, Georgetown, TX (US); Andrew N. Solomon, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 12/879,743

(22) Filed: Sep. 10, 2010

(65) Prior Publication Data

US 2012/0066431 A1    Mar. 15, 2012

(51) Int. Cl.
    G06F 12/06    (2006.01)
    G06F 12/16    (2006.01)
(52) U.S. Cl. . 711/152; 711/114; 711/170; 711/E12.007; 711/E12.014
(58) Field of Classification Search .................. 711/114, 711/152, 170, E12.007, E12.014
    See application file for complete search history.

(56) References Cited

U.S. PATENT DOCUMENTS

| | | | |
|---|---|---|---|
| 6,442,649 B1 * | 8/2002 | Anderson | 711/114 |
| 6,609,213 B1 | 8/2003 | Nguyen et al. | |
| 6,651,154 B1 * | 11/2003 | Burton et al. | 711/202 |
| 6,687,805 B1 | 2/2004 | Cochran | |
| 2003/0145167 A1 * | 7/2003 | Tomita | 711/114 |
| 2003/0233596 A1 * | 12/2003 | Corbin et al. | 714/5 |
| 2004/0148459 A1 * | 7/2004 | Ali et al. | 711/114 |
| 2006/0101204 A1 | 5/2006 | Bao | |
| 2006/0107085 A1 | 5/2006 | Daniels et al. | |
| 2007/0288717 A1 * | 12/2007 | Camiel | 711/170 |
| 2008/0005191 A1 | 1/2008 | Lashley et al. | |
| 2008/0005468 A1 | 1/2008 | Faibish et al. | |
| 2009/0307423 A1 * | 12/2009 | Galloway et al. | 711/114 |
| 2009/0319869 A1 * | 12/2009 | Read | 714/763 |

* cited by examiner

*Primary Examiner* — Hal Schnee
(74) *Attorney, Agent, or Firm* — DeLizio Gilliam, PLLC (57) ABSTRACT

Embodiments include a method comprising detecting addition of a new nonvolatile machine-readable medium to a data storage pool of nonvolatile machine-readable media. The method includes preventing from being performed a first operation of a file system that requires a first parameter that identifies a logical indication of a location within the nonvolatile machine-readable media for the file system, until logical indications of locations within the new nonvolatile machine-readable medium for the file system have been stored in the data storage pool. The method includes allowing to be performed, prior to logical indications of locations within the new nonvolatile machine-readable medium being stored in the data storage pool, a second operation of the file system that does not require a second parameter that identifies a logical indication of a location within the nonvolatile machine-readable media, wherein the second operation causes data to be written into the new nonvolatile machine-readable medium.

18 Claims, 4 Drawing Sheets

RECOVERABILITY WHILE ADDING STORAGE TO A REDIRECT-ON-WRITE STORAGE POOL

BACKGROUND

File systems employ different methods to ensure the consistency of the file system in the event of a system crash. One approach is for the file system to periodically backup the data, by writing the modified data to new locations to persistent storage. These views are called consistency snapshots. After a system crash, the file system starts with the top of the last consistency snapshot of the file system, which is guaranteed to be consistent.

SUMMARY

Embodiments include a method comprising detecting addition of a new nonvolatile machine-readable medium to a data storage pool of nonvolatile machine-readable media. The method includes preventing from being performed a first operation of a file system that requires a first parameter that identifies a logical indication of a location within the nonvolatile machine-readable media of the data storage pool for the file system, until logical indications of locations within the new nonvolatile machine-readable medium for the file system have been stored in the data storage pool of nonvolatile machine-readable media. The method includes allowing to be performed, prior to logical indications of locations within the new nonvolatile machine-readable medium being stored in the data storage pool of nonvolatile machine-readable media, a second operation of the file system that does not require a second parameter that identifies a logical indication of a location within the nonvolatile machine-readable media, wherein the second operation causes data to be written into the new nonvolatile machine-readable medium.

Embodiments include a method comprising receiving, into a system, a request to add a new nonvolatile machine-readable medium to a data storage pool of nonvolatile machine-readable media that is accessible for storing data. The method includes setting a flag that precludes executing of any operations having a parameter that references a block number in the data storage pool, until a logical-to-physical translation for blocks in the new nonvolatile machine-readable medium has been stored as part of a snapshot of data from a volatile machine-readable medium to the data storage pool of nonvolatile machine-readable media. The method includes storing the snapshot of the data from the volatile machine-readable medium to the data storage pool of nonvolatile machine-readable media. The method includes clearing the flag to enable writing the block-specific log entry into the log, after storing the snapshot of the data from the volatile machine-readable medium to the data storage pool of nonvolatile machine-readable media.

Embodiments include an apparatus comprising a processor. The apparatus includes a block map module executable on the processor. The block map module is configured to detect addition of a new nonvolatile machine-readable medium to a data storage pool of nonvolatile machine-readable media. The block map module is configured to prevent from being performed a first operation of a file system that requires a first parameter that identifies a logical indication of a location within the nonvolatile machine-readable media of the data storage pool for the file system, until logical indications of locations within the new nonvolatile machine-readable medium for the file system have been stored in the data storage pool of nonvolatile machine-readable media. The block map module is configured to allow to be performed, prior to logical indications of locations within the new nonvolatile machine-readable medium being stored in the data storage pool of nonvolatile machine-readable media, a second operation of the file system that does not require a second parameter that identifies a logical indication of a location within the nonvolatile machine-readable media, wherein the second operation causes data to be written into the new nonvolatile machine-readable medium.

Embodiments include a computer program product for addition of a new nonvolatile machine-readable medium to a data storage pool of nonvolatile machine-readable media. The computer program product comprises a computer readable storage medium having computer readable program code embodied therewith. The computer readable program code is configured to receive, into a system, a request to add the new nonvolatile machine-readable medium to the data storage pool of nonvolatile machine-readable media that is accessible for storing data. The computer readable program code is configured to set a flag that precludes executing of any operations having a parameter that references a block number in the data storage pool, until a logical-to-physical translation for blocks in the new nonvolatile machine-readable medium has been stored as part of a snapshot of data from a volatile machine-readable medium to the data storage pool of nonvolatile machine-readable media. The computer readable program code is configured to store the snapshot of the data from the volatile machine-readable medium to the data storage pool of nonvolatile machine-readable media. The computer readable program code is configured to clear the flag to enable writing the block-specific log entry into the log, after storing the snapshot of the data from the volatile machine-readable medium to the data storage pool of nonvolatile machine-readable media.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. In other instances, well-known instruction instances, protocols, structures, and techniques have not been shown in detail in order not to obfuscate the description.

Some example embodiments use consistency snapshots along with an intent log to recover from a system crash. A consistency snapshot can comprise a full and consistent view of the current state of the file system that is made persistent on disk. The consistency snapshots are periodically written to a nonvolatile machine-readable medium. A nonvolatile machine-readable medium can be representative of any type of persistent storage (e.g., magnetic-based hard disks, optical discs and flash memory). In some example embodiments, the consistency snapshots are written to a nonvolatile machine-readable medium every five seconds. The intent log can be used to provide recoverability for certain operations in the event of a system crash. The intent log is written synchronously and does not need to wait for a consistency snapshot interval to be flushed to persistent storage. This log allows those specific operations to be considered complete (so that success can be returned to the caller) in between consistency snapshot intervals. After a system crash, the file system starts at the point of the last consistency snapshot and moves forward by replaying each record in the intent log in order. After completion of the replay, any operations which previously returned success to the caller prior to the crash have once again been completed. However, operations that were in flight at the time of the system crash may or may not be completed, depending on whether or not the synchronous write for the log record was successful.

Some example embodiments include a storage pool that is a collection of data Logical Unit Numbers (LUNs) whose aggregate capacity backs files and file folders of file systems. The file systems can be on individual machines or virtual machines that use the storage pool as storage Data LUNs can be added to, replaced or removed from the storage pool without disruption to the file systems, because of a virtualization layer that handles translation of logical addresses into physical addresses on the specific data LUNs. Also, the file systems use a common block map interface that determines which blocks in the shared aggregate are considered free and which are allocated.

In the intent log, many of the log records do not include a reference to specific block numbers in the storage pool. Rather, many of the log records simply store the logical arguments to the file system operation. For example, for creating a new file, the logical arguments can include the name of the file, the directory where the file will be created and the permissions for the file. However, certain log records in the intent log do include specific block numbers. For example, a named attribute (i.e., extended attribute) is a variable sized data region that is updated atomically, whether the region is being created, removed or written. The named attribute is made atomic by synchronously writing the log record into the intent log, which provides the block number of a starting point for the variable sized data region, thereby allowing the rest of this region to be discovered during log replay based on the starting point.

A problem can occur if a new data LUN is added to the storage pool and then a system crash occurs before the next consistency snapshot interval. In particular, logical-to-physical translations for the newly added data LUNs (provided by the virtualization layer) have not been flushed to persistent storage before this next consistency snapshot interval. Accordingly, when the system reverts to the previous consistency snapshot interval, there are no logical-to-physical translations for the newly added data LUNs.

Also, if the blocks in the newly added data LUNs were provided for use prior to the consistency snapshot interval and if these blocks were used as part of the storage of the intent log itself, the log replay will fail after attempting to read that portion of the intent log because the block translation(s) is incorrect or invalid. Similarly, if these particular blocks show up in a log record (see extended attribute example above), the log replay will fail, when it tries to replay that log record, because the read cannot complete without knowing the logical-to-physical translation for these particular blocks.

One possible approach to avoid this problem could be to require that the logical-to-physical translations for these new blocks be flushed to persistent storage during a consistency snapshot before allowing these new blocks to be used by the file systems. However, there are two drawbacks with this approach that both relate to a situation when the file systems are running out of free blocks in the aggregate. The first drawback occurs when a data LUN is to be added to the storage pool with little capacity, wherein the data LUN is much larger than the storage pool itself. An example can be a situation where the storage pool is 1 Gigabyte, while the data LUN is multiple Terabytes. In this situation, there may not be enough free blocks to persistently store the logical-to-physical translations of the new blocks in the upcoming consistency snapshot. The second drawback occurs when the storage pool has run out of free blocks entirely, such that new data LUNs need to be added to increase the capacity of the storage pool.

Some example embodiments overcome both of these drawbacks. In particular, some example embodiments can use the capacity of the new data LUNs to publish the logical-to-physical translations prior to the publishing of an upcoming consistency snapshot that includes the logical-to-physical translations.

In some example embodiments, when a data LUN is added to the storage pool, a flag remains set until the next consistency snapshot has been published. Operations that need to reference a specific block number are blocked while that flag is present. Those operations are allowed to proceed once the next consistency snapshot has been published. Such a configuration prevents those operations from being unrecoverable in the event of a system crash.

Also, there is the possibility that as the intent log grows the log can accidently use new blocks from the newly added data LUNs before the logical-to-physical translations for these new blocks have been flushed to persistent storage. Accordingly in some example embodiments, space for the intent log comes from a preallocated region that was determined and flushed to persistent storage in an earlier consistency snapshot. In some example embodiments, if the preallocated region for the intent log is completely filled, any new incoming operations are postponed until after the upcoming consistency snapshot has been published.

Figure 1:
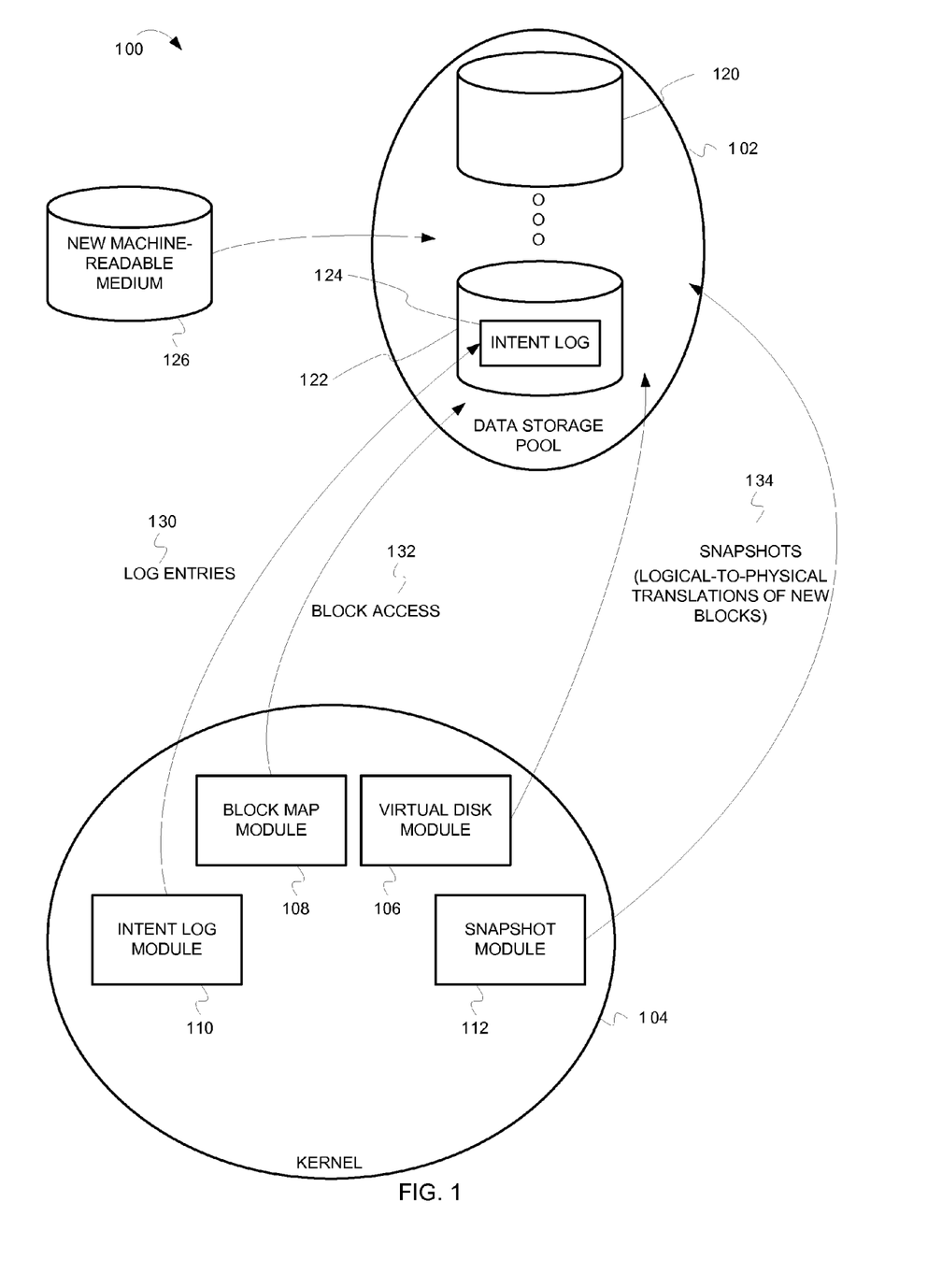
FIG. 1 is diagram of a system to enable recovery after a system crash that occurs while adding nonvolatile storage into a data storage pool, according to some example embodiments.

FIG. 1 is diagram of a system to enable recovery after a system crash that occurs while adding nonvolatile storage into a data storage pool, according to some example embodiments. FIG. 1 includes a system 100 that includes a data storage pool 102 and a kernel 104. The data storage pool 102 can comprise one to N number of nonvolatile machine-readable media that is accessible by one or more file systems (not shown). In this example, the data storage pool 102 includes a nonvolatile machine-readable medium 120 and a nonvolatile machine-readable medium 122. Also shown, a new machine-readable medium 126 that is being added to the data storage pool 102.

The kernel 104 is a part of an operating system that can be executing on a computer that is physically separate from that hardware that includes the data storage pool 102 The kernel 104 includes a number of kernel extensions to enable various functionality within the kernel 104. In this example, a kernel extension has been loaded into the kernel 104 that uses the operations of a virtual disk module 106, a block map module 108, an intent log module 110, and a snapshot module 112.

The functionality added to the kernel 104 is described in more detail below in conjunction with the operations of the virtual disk module 106, the block map module 108, the intent log module 110, and the snapshot module 112. The virtual disk module 106, the block map module 108, the intent log module 110, and the snapshot module 112 can be software, firmware, hardware or a combination thereof.

The nonvolatile machine-readable media 120, 122 and 126 can be data LUNs. Examples include magnetic-based hard disks, optical discs, flash memory, etc. The data storage pool 102 is a collection of nonvolatile machine-readable media whose aggregate capacity is shared by one or more file systems. As described above, nonvolatile machine-readable media can be added, replaced or removed from the data storage pool 102 without disruption to the file systems. In some example embodiments, the virtual disk module 106 provides logical-to-physical translations of the logical addresses within the aggregate data storage pool 102 that are used to access the blocks therein. In particular, the virtual disk module 106 can collect the blocks across the different nonvolatile machine-readable media in the data storage pool 102 and then present these blocks as a logical space from 0 to N that are accessible by any number of file systems. For example, instead of accessing a block in one of the nonvolatile machine-readable media using a physical address (e.g., "hdisk 5, offset 56), the block is accessed by a logical address (e.g., block 155).

The data storage pool 102 stores an intent log 124. The intent log 124 can be used to provide recoverability for certain operations in the event of a system crash. The intent log 124 is written synchronously and does not need to wait for a consistency snapshot interval to be flushed to persistent storage in the data storage pool 102 (as further described below). The intent log 124 allows those specific operations to be considered complete (so that success can be returned to the caller) in between consistency snapshot intervals. After a system crash, the file system starts at the point of the last consistency snapshot and moves forward by replaying each record in the intent log 124 in order. After completion of the replay, any operations which previously returned success to the caller prior to the crash have once again been completed. As shown, the intent log module 110 stores log entries 130 into the intent log 124 as certain operations (writes to data in a file, deletion of a file, etc.) are executed in the system 100. Also, the intent log module 110 retrieves the log entries stored in the intent log 124 for replay after a system crash.

The virtual disk module 106 manages the translations from logical to physical and vice versa for the addressing of the blocks in the data storage pool 102. The management includes the assigning the translations of the logical addresses to the physical addresses of the blocks (as described above).

The block map module 108 manages the blocks across the different nonvolatile machine-readable media in the data storage pool 102. The block map module 108 determines which blocks are free and which are allocated in the logical space of the data storage pool 102 (shown as block access 132). Also, the block map module 108 enables access to newly added blocks as a new nonvolatile machine-readable medium is added to the data storage pool 102. In some example embodiments, the block map module 108 sets a flag to stop allocation for certain operations that write log entries to the intent log 124. These certain operations include operations that need to reference a specific block number in the logical space of the data storage pool 102. The block map module 108 sets this flag after a new machine-readable medium is added to the data storage pool 102 but prior to the translations for these new blocks being persistently stored in the data storage pool 102 as part of a snapshot. The block map module 108 clears this flag to allow these operations once these translations are persistently stored in the data storage pool 102. As further described below, such a configuration prevents those certain operations from being unrecoverable in the event of a system crash.

The snapshot module 112 periodically (e.g., every five seconds) stores a snapshot (shown as 134) of any modified data that is within a volatile machine-readable medium (e.g., Random Access Memory (RAM)) to the data storage pool 102. In some example embodiments, the snapshot module 112 writes the modified data to new locations on disk (known as "redirect on write") in a bottom-up order. Accordingly, after a system crash, the file system starts with the top of the last snapshot of the file system which is guaranteed to be consistent. As shown, the snapshots 134 include logical-to-physical translations of new blocks after a new machine-readable medium is added to the data storage pool 102.

Figure 2:
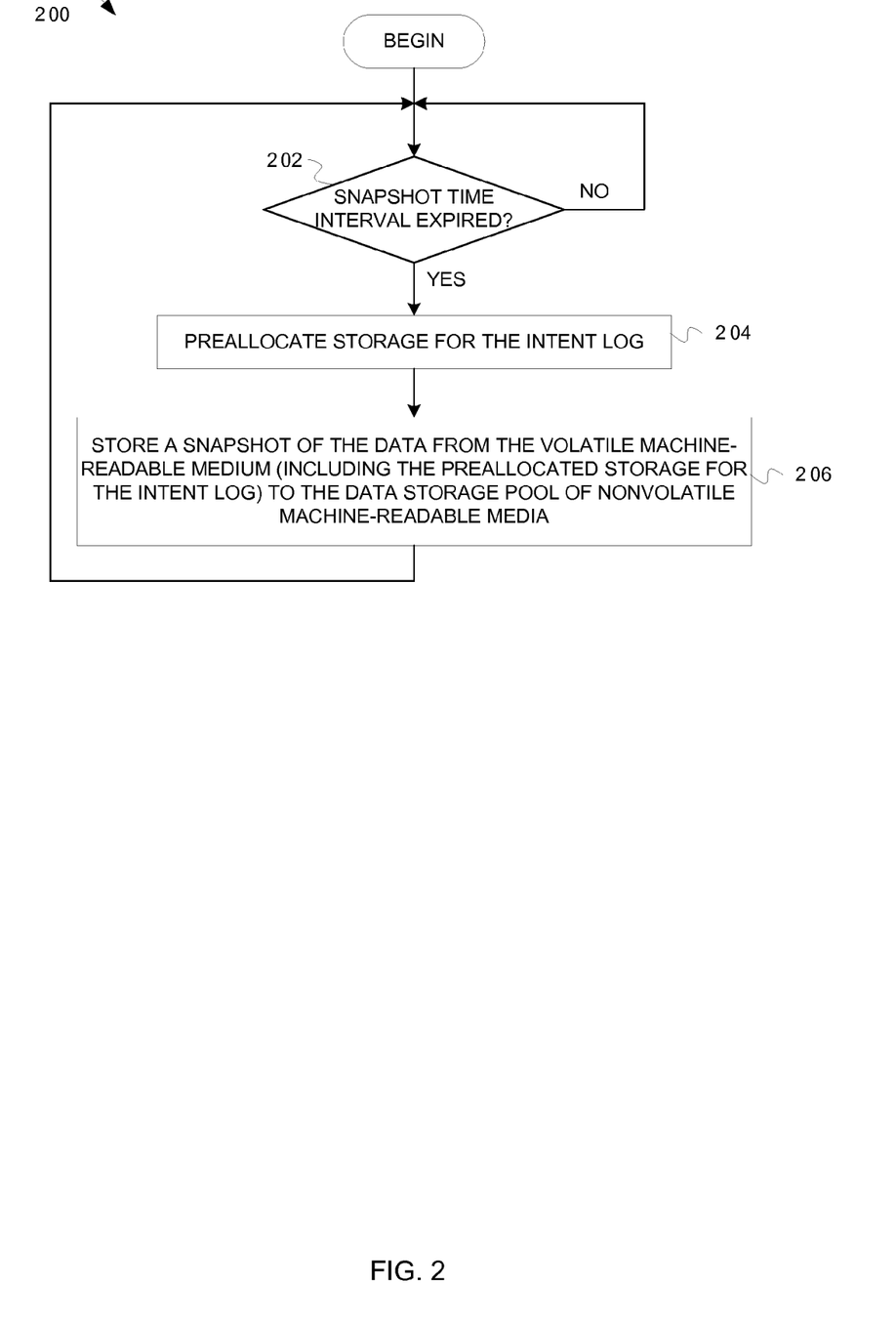
FIG. 2 is a flowchart illustrating operations to store a snapshot of data from a volatile machine-readable medium to a nonvolatile storage, according to some example embodiments.
Figure 3:
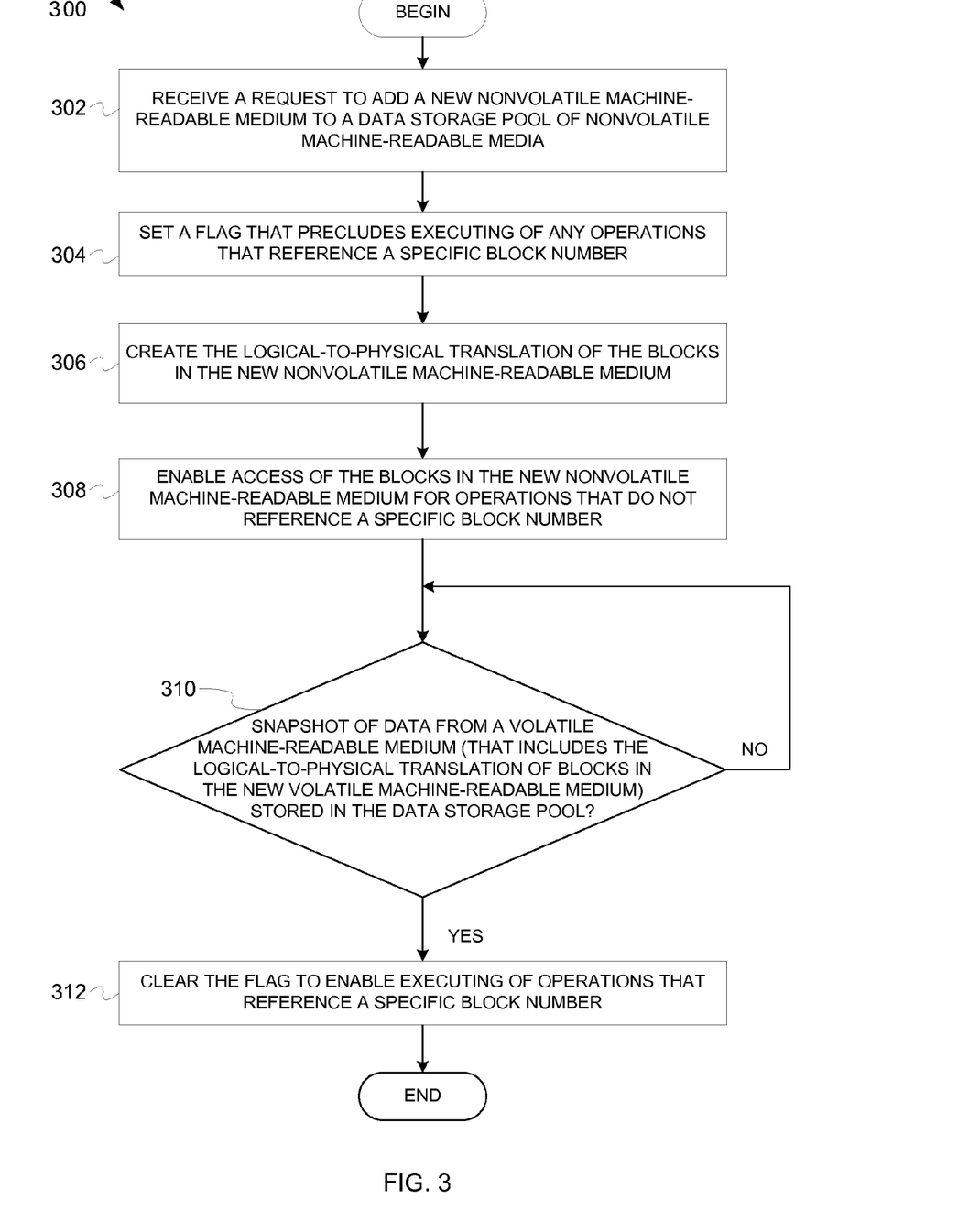
FIG. 3 is a flowchart illustrating operations to add a new persistent storage into a data storage pool, according to some example embodiments.

Operations for system crash recovery during the addition of persistent storage to a data storage pool are now described. In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flowchart. Two flowcharts are now described. The operations of the two flowcharts are described as being performed by multiple modules executing in a same kernel that is part of an operating system to provide a kernel extension. However, embodiments are not so limited. For example, some or all of the operations can be performed by the kernel or external to the kernel. In another example, the operations can be performed by different modules than those described herein. For example, the operations can be performed by a single module. FIG. 2 illustrates operations for periodic persistent storage of a snapshot of modified data. FIG. 3 illustrates operations to add a new persistent storage into a data storage pool. FIGS. 2-3 are described with reference to FIG. 1. FIG. 2 is first described. FIG. 2 is a flowchart illustrating operations to store a snapshot of data from a volatile machine-readable medium to a nonvolatile storage, according to some example embodiments.

The snapshot module 112 determines whether a snapshot time interval has expired (202). In particular, the snapshot module 112 determines the elapse of a time since a last snapshot of the data in volatile machine-readable medium has been stored into persistent storage of the data storage pool 102. The snapshot time interval can be any periodic interval (e.g., five second, three seconds, etc.). Accordingly, the snapshot module 112 determines whether this time interval has expired relative to the storing of the previous snapshot to persistent storage in the data storage pool 102. If the snapshot time interval has not expired, the snapshot module 112 continues checking for this expiration again (returning to 202). If the snapshot time interval has expired, the operations of the flowchart 200 continue at 204.

The intent log module 110 preallocates storage for the intent log (204). With reference to FIG. 1, the intent log module 110 preallocates a set of amount of storage for the intent log 124. This preallocation occurs in conjunction with and prior to the storage of a snapshot. As noted above, this preallocation prevents the intent log 124 from using new blocks (from a newly added machine-readable storage medium that has been added to the data storage pool) whose translations have not yet been flushed to persistent storage as part of a snapshot. Accordingly, this preallocation of the intent log 124 occurs prior to the flushing of a snapshot to persistent storage (as described below). In some example embodiments, if the preallocated region for the intent log is completely filled, any new incoming operations are postponed until after the upcoming consistency snapshot has been published. In some example embodiments, the preallocation occurs with a consistency snapshot. In other words, part of publishing of a current generation's consistency snapshot involves setting aside space for the intent log to use in a future generation. The operations of the flowchart 200 continue.

The snapshot module 112 stores a snapshot of the modified data from the volatile machine-readable medium to the data storage pool of nonvolatile machine-readable media (206). This snapshot includes the preallocated storage for the intent log 124 that was created by the intent log module 110. With reference to FIG. 1, the snapshot module 112 periodically stores the snapshots 234 in the data storage pool 102. As further described below, these snapshots include the logical-to-physical translations of any new blocks that were added to the data storage pool 102 as a result of adding a new machine-readable medium thereto. The operations of the flowchart 200 continue at 202, where the determination is again made of whether the snapshot time interval has expired. These operations can continue to execute while the system is operating to ensure that snapshots of modified data are periodically captured to assist in recover of the system if a crash occurs.

FIG. 3 is a flowchart illustrating operations to add a new persistent storage into a data storage pool, according to some example embodiments. The operations of the flowchart 300 can be executed independent of and at a same time as the operations of the flowchart 200.

The block map module 108 receives a request to add a new nonvolatile machine-readable medium to the data storage pool of nonvolatile machine-readable media (302). With reference to FIG. 1, the block map module 108 receives a request to add the new nonvolatile machine-readable medium 126 to the data storage pool 102. For example, this request can be received as a result of a new nonvolatile machine-readable medium being added to the system 100, as a result of running out of free space in the data storage pool, etc. Operations of the flowchart 300 continue.

The block map module 108 sets a flag that precludes executing of any operations that reference a specific block number (304). In particular, the block map module 108 sets the flag that precludes executing of any operations that reference a specific block number within the address space of the data storage pool 102 (i.e., the logical addressing from 0 to N as described above). This preclusion prevents the storage of a log entry in the intent log 124 that references a specific block number. Accordingly, there will be no log entries that include a reference to a block number for which a logical-to-physical translation has not been persistently stored in the data storage pool. If this preclusion does not occur, if the system 100 crashes such that the system 100 reverts to the previous snapshot, no translations are available for the blocks of the newly added machine-readable storage medium. If these new blocks were referenced in a log entry, the log replay (executed to provide system recovery as described above) would fail when this logy entry were replayed. In particular, the translation of this block could not be made because the translation would have not been persistently stored. In some example embodiments, the system 100 can accept the operations. However, the block access module 108 would suspend execution of such operations until the flag is cleared (as further described below). An example of an operation that references a specific block number includes the operation for the named attribute (as described above). Operations of the flowchart 300 continue.

The virtual disk module 106 creates the logical-to-physical translation of the blocks in the new nonvolatile machine-readable medium (306). This translation presents blocks in the data storage pool 102 as one logical space from 0 to N that are accessible by any number of files systems. This translation can be created in a volatile machine-readable medium of the system 100, such that the translation needs to be subsequently persistently stored in the data storage pool 102 as part of a snapshot. Operations of the flowchart 300 continue.

The block map module 108 enables access of these blocks of the new nonvolatile machine-readable medium for operations that do not reference a specific block number (308). In particular, any file system operation that does not include a parameter that references a specific block number can be executed once the block map module 108 makes these blocks accessible. Such operations are not affected by the setting of the flag (see 304). In other words, operations for adding and accessing the blocks to the block map of the data storage pool 102 can be executed prior to clearing of the flag (described below). Accordingly, operations to publish the logical-to-physical translations can use the blocks of the new nonvolatile machine-readable media. Also, operations to add the blocks of the new nonvolatile machine-readable medium can still be executed. Operations of the flowchart 300 continue.

The block map module 108 determines whether a snapshot of data from a volatile machine-readable medium has been stored in the data storage pool (since this flag has been set) (310). In particular, the block map module 108 determines whether a snapshot that includes the logical-to-physical translation of the blocks of the new nonvolatile machine-readable medium has been stored in the data storage pool. With reference to FIG. 1, the block map module 108 determines whether the snapshot module 112 has flushed a snapshot since the request to add the new nonvolatile machine-readable medium 126 to the data storage pool 102. If the snapshot has not been stored in the data storage pool, operations of the flowchart 300 return to 310 where this determination is again made. If the snapshot has been stored in the data storage pool, operations of the flowchart 300 continue at 312.

The block map module 108 clears the flag to enable executing of operations that reference a specific block number (312). These operations that reference a specific block number can now be executed in the system 100. Accordingly, if a system crash does occur the system 100 can be recovered back to its state prior to the crash. The log replay can be successfully executed as the operations referencing a specific block number would locate the blocks because the translations were persistently stored. Operations of the flowchart 300 are complete.

Figure 4:
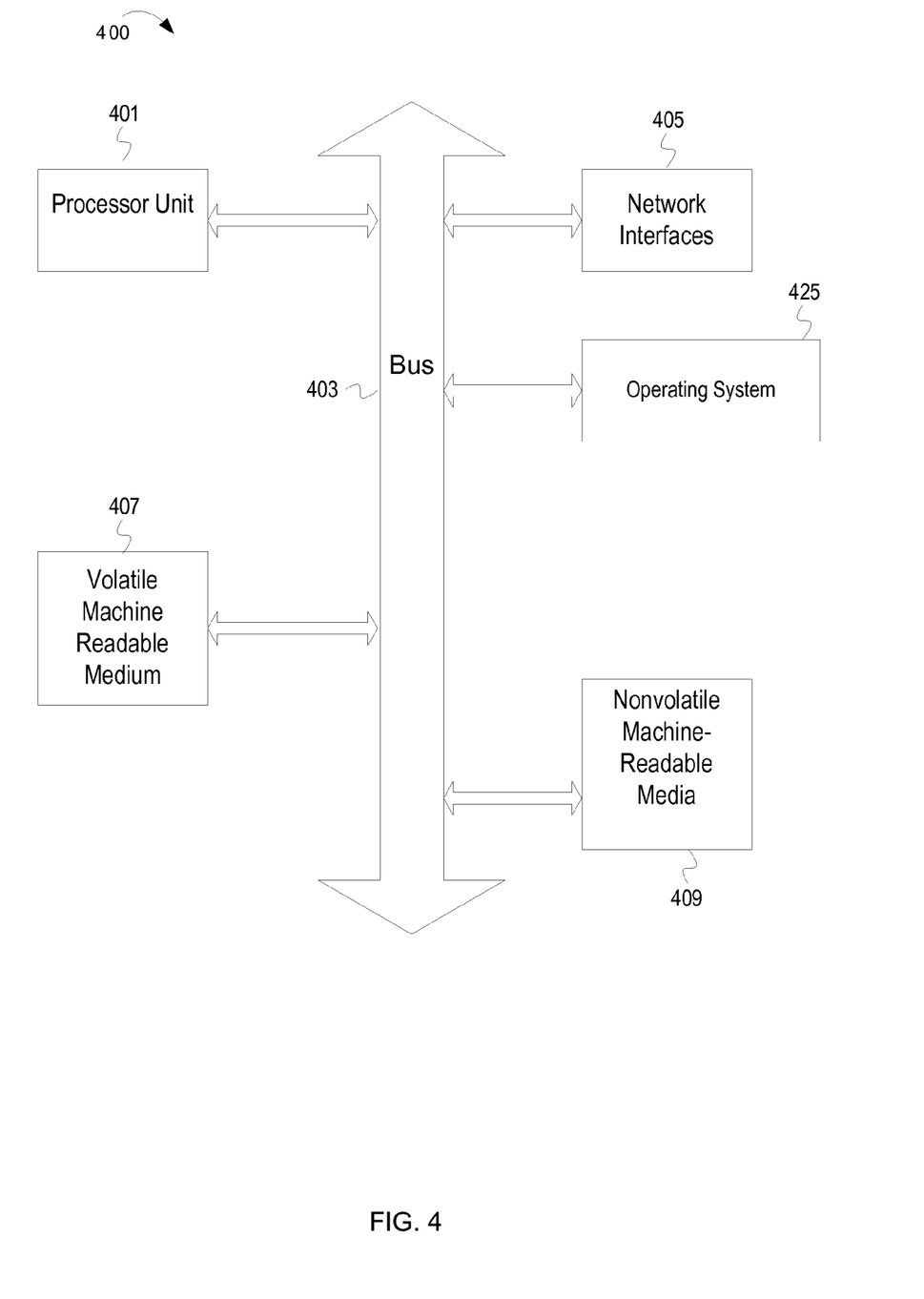
FIG. 4 is a block diagram illustrating a computer system, according to some example embodiments.

FIG. 4 is a block diagram illustrating a computer system, according to some example embodiments. FIG. 4 can be representative of a system having a data storage pool that provides crash recovery (as described above). A computer system 400 includes a processor unit 401 (possibly including multiple processors, multiple cores, multiple nodes, and/or implementing multi-threading, etc.). The computer system 400 includes a volatile machine-readable medium 407. The volatile machine-readable medium 407 can be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media.

The computer system 400 also includes a bus 403 (e.g., PCI, ISA, PCI-Express, HyperTransport®, InfiniBand®, NuBus, etc.), a network interface 405 (e.g., an ATM interface, an Ethernet interface, a Frame Relay interface, SONET interface, wireless interface, etc.), and a nonvolatile machine-readable media 409 (e.g., optical storage, magnetic storage, etc.). The nonvolatile machine-readable media 409 can be representative of the data storage pool 102 of FIG. 1. The computer system 400 also includes an operating system 425 that can include the kernel 104 and the kernel extension services including the virtual disk module 106, the block map module 108, the intent log module 110 and the snapshot module 112.

Further, realizations may include fewer or additional components not illustrated in FIG. 4 (e.g., video cards, audio cards, additional network interfaces, peripheral devices, etc.). The processor unit 401, the storage device(s) 409, and the network interface 405 are coupled to the bus 403. Although illustrated as being coupled to the bus 403, the memory 407 may be coupled to the processor unit 401.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for optimizing design space efficiency as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter.

In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:

detecting addition of a new nonvolatile machine-readable medium to a data storage pool of nonvolatile machine-readable media;

preventing from being performed a first operation of a file system that requires a first parameter that identifies a logical indication of a location within the nonvolatile machine-readable media of the data storage pool for the file system, until logical indications of locations within the new nonvolatile machine-readable medium for the file system have been stored in the data storage pool of nonvolatile machine-readable media;

allowing to be performed, prior to logical indications of locations within the new nonvolatile machine-readable medium being stored in the data storage pool of nonvolatile machine-readable media, a second operation of the file system that does not require a second parameter that identifies a logical indication of a location within the nonvolatile machine- readable media, wherein the second operation causes data to be written into the new nonvolatile machine-readable medium, wherein the logical indication of the location is required to enable recoverability of the first operation after a system crash and during a time period between a time when the new nonvolatile machine-readable medium is added to the data storage pool and a time when the logical indication of the location has been stored in the nonvolatile machine-readable media.

2. The method of claim 1, further comprising storing, within the volatile machine-readable media, logical indications for locations in the new nonvolatile machine-readable medium, after receiving a request to add the new nonvolatile machine-readable medium.

3. The method of claim 1, wherein the logical indications comprise logical-to-physical translations and wherein the locations comprise blocks in the new volatile machine-readable medium.

4. A method comprising:

receiving, into a system, a request to add a new nonvolatile machine-readable medium to a data storage pool of nonvolatile machine-readable media that is accessible for storing data;

setting a flag that precludes executing of any operations having a parameter that references a block number in the data storage pool, until a logical-to-physical translation for blocks in the new nonvolatile machine-readable medium has been stored as part of a snapshot of data from a volatile machine-readable medium to the data storage pool of nonvolatile machine-readable media;

storing the snapshot of the data from the volatile machine-readable medium to the data storage pool of nonvolatile machine-readable media; and clearing the flag to enable writing a block-specific log entry into a log, after storing the snapshot of the data from the volatile machine-readable medium to the data storage pool of nonvolatile machine-readable media.

5. The method of claim 4, further comprising:

creating the block-specific log entry into the log, in response to executing an operation having the parameter that references the block number in the data storage pool, after clearing the flag, wherein the log comprises a plurality of log entries for data that enables recoverability of operations if the system crashes, wherein the block-specific log entry comprises an identification of a block within the machine-readable media of the data storage pool.

6. The method of claim 5, wherein the block-specific log entry comprises data to recover execution of the operation having the parameter that references the block number in the data storage pool after the system crashes.

7. The method of claim 5, further comprising preallocating storage space for the log in the data storage pool of nonvolatile machine-readable media, after storing the snapshot of the data from the volatile machine-readable medium to the data storage pool of nonvolatile machine-readable media.

8. The method of claim 7, wherein the storage space for the log is preallocated in the data storage pool of nonvolatile machine-readable media prior to said storing the snapshot of the data from the volatile machine-readable medium to the data storage pool of nonvolatile machine-readable media.

9. The method of claim 7, further comprising:

determining whether the storage space for the log is full after storing a log entry of the plurality of log entries into the log; and responsive to determining that the storage for the log is full, delaying storing of any new log entries into the log until storing a new snapshot of the data from the volatile machine-readable medium to the data storage pool of nonvolatile machine-readable media.

10. An apparatus comprising:

a processor;

a block map module executable on the processor, the block map module configured to detect addition of a new nonvolatile machine-readable medium to a data storage pool of nonvolatile machine-readable media;

prevent from being performed a first operation of a file system that requires a first parameter that identifies a logical indication of a location within the nonvolatile machine-readable media of the data storage pool for the file system, until logical indications of locations within the new nonvolatile machine-readable medium for the file system have been stored in the data storage pool of nonvolatile machine-readable media;

allow to be performed, prior to logical indications of locations within the new nonvolatile machine-readable medium being stored in the data storage pool of nonvolatile machine-readable media, a second operation of the file system that does not require a second parameter that identifies a logical indication of a location within the nonvolatile machine-readable media, wherein the second operation causes data to be written into the new nonvolatile machine-readable medium, wherein the logical indication of the block location is required to enable recoverability of the first operation after a system crash and during a time period between a time when the new nonvolatile machine-readable medium is added to the data storage pool and a time when the logical indication of the location has been stored in the nonvolatile machine-readable media.

11. The apparatus of claim 10, wherein the block map module is configured to store, within the volatile machine-readable media, logical indications for locations in the new nonvolatile machine-readable medium, after receipt of a request to add the new nonvolatile machine-readable medium.

12. The apparatus of claim 10, wherein the logical indications comprise logical-to-physical translations and wherein the locations comprise blocks in the new volatile machine-readable medium.

13. A computer program product for addition of a new nonvolatile machine-readable medium to a data storage pool of nonvolatile machine-readable media, the computer program product comprising:
    a computer readable storage medium having computer readable program code embodied therewith, the computer readable program code configured to,
        receive, into a system, a request to add the new nonvolatile machine-readable medium to the data storage pool of nonvolatile machine-readable media that is accessible for storing data;
        set a flag that precludes executing of any operations having a parameter that references a block number in the data storage pool, until a logical-to-physical translation for blocks in the new nonvolatile machine-readable medium has been stored as part of a snapshot of data from a volatile machine-readable medium to the data storage pool of nonvolatile machine-readable media;
        store the snapshot of the data from the volatile machine-readable medium to the data storage pool of nonvolatile machine-readable media; and
        clear the flag to enable writing a block-specific log entry into a log, after storing the snapshot of the data from the volatile machine-readable medium to the data storage pool of nonvolatile machine-readable media.

14. The computer program product of claim 13, wherein the computer readable program code is configured to,
    create the block-specific log entry into the log, in response to executing an operation having the parameter that references the block number in the data storage pool, after clearing the flag,
    wherein the log comprises a plurality of log entries for data that enables recoverability of operations if the system crashes, wherein the block-specific log entry comprises an identification of a block within the machine-readable media of the data storage pool.

15. The computer program product of claim 14, wherein the block-specific log entry comprises data to recover execution of the operation having the parameter that references the block number in the data storage pool after the system crashes.

16. The computer program product of claim 14, where the computer readable program code is configured to preallocate storage space for the log in the data storage pool of nonvolatile machine-readable media, after storage of the snapshot of the data from the volatile machine-readable medium to the data storage pool of nonvolatile machine-readable media.

17. The computer program product of claim 16, wherein the storage space for the log is preallocated in the data storage pool of nonvolatile machine-readable media prior to storing of the snapshot of the data from the volatile machine-readable medium to the data storage pool of nonvolatile machine-readable media.

18. The computer program product of claim 16, where the computer readable program code is configured to
    determine whether the storage space for the log is full after storing a log entry of the plurality of log entries into the log; and
    responsive to determining that the storage for the log is full, delay storage of any new log entries into the log until storage of a new snapshot of the data from the volatile machine-readable medium to the data storage pool of nonvolatile machine-readable media.

* * * * *